United States Patent [19]

Vassiliou

[11] Patent Number: 4,645,692
[45] Date of Patent: Feb. 24, 1987

[54] POLYVINYL FLUORIDE COATING PROCESS

[75] Inventor: Eustathios Vassiliou, Newark, Del.

[73] Assignee: E. I. Du Pont de Nemours and Company, Wilmington, Del.

[21] Appl. No.: 831,419

[22] Filed: Feb. 20, 1986

[51] Int. Cl.⁴ .......................... B05D 1/18; B05D 3/02
[52] U.S. Cl. ................................ 427/318; 427/388.2; 427/435
[58] Field of Search ...................... 427/318, 388.2, 435

[56]   References Cited
U.S. PATENT DOCUMENTS

| | | | |
|---|---|---|---|
| 2,953,818 | 9/1960 | Bartron | 264/289 |
| 3,139,470 | 6/1964 | Prengle et al. | 264/289 |
| 3,574,071 | 4/1970 | Covino | 204/38 |

Primary Examiner—Michael R. Lusignan
Attorney, Agent, or Firm—Richard H. Burgess

[57] ABSTRACT

Substrates are coated by heating the substrates to temperatures of 120°-260° C. and dipping them into a bath of polyvinyl fluoride dispersed in latent solvent at temperatures below 100° C.

3 Claims, 1 Drawing Figure

POLYVINYL FLUORIDE COATING PROCESS

BACKGROUND OF THE INVENTION

This invention relates to a process for producing coatings of polyvinyl fluoride (PVF) on substrates. More particularly, it relates to such a process involving dipping the substrate into a bath.

PVF is generally not soluble at room temperature in conventional solvents, however, it can be put into solution with so-called latent solvents. A dispersion of PVF powder is suspended in latent solvent and heated to a first temperature at which a gel is formed and then to a higher second temperature at which a solution is formed. Latent solvents and other technology useful in handling PVF are discussed in U.S. Pat. Nos. 2,953,818—Barton (Sept. 27, 1980) and 3,139-470—Prengle et al. (June 30, 1964), both incorporated herein by reference.

U.S. Pat. No. 3,574,071—Covin (Apr. 6, 1970), teaches a method for oxidizing an aluminum substrate and then coating it with a fluorocarbon coating such as of tetrafluoroethylene or a copolymer of tetrafluoroethylene and hexafluoropropylene by dipping the substrate into an aqueous bath of the coating composition, with the bath at a temperature between about 32° and 43° C. and the substrate at temperatures below 100° C. and preferably between about 66° and 93° C. Such temperatures are too low for gelling and coalescing coating of the quite different material PVF.

It is difficult to make uniform coatings of PVF due to its thixotropic behavior in latent solvents. Spraying tends to give irregular thicknesses or wavey surfaces such as in an orange peel configuration. Dipping is generally unsatisfactory because of excessive sagging.

SUMMARY OF THE INVENTION

Figure 1:
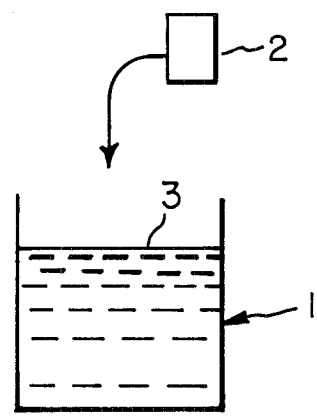
FIG. 1, the sole FIGURE of the drawing, is a schematic illustration of dipping a heated substrate 2 to be coated into a colder bath 1 of coating composition 3.

The present invention provides a process for coating substrates by dipping a hotter substrate into a colder bath of polyvinyl fluoride dispersion in latent solvent,
wherein the substrate is at a temperature in the range of 120°–260° C. and the bath is at a temperature below 100° C.,
then removing the resulting coated substrate from the bath and curing the coating to a coalesced condition.

Preferably, the bath has a viscosity of at least 2,500 centipoises, measured with a number 3 or 4 spindle in a Brookfield Viscometer at 10 revolutions per minute (rpm).

DETAILED DESCRIPTION

By dipping a hotter substrate at a temperature high enough to cause coalescence of a PVF coating, into a colder high bath of PVF dispersed in latent solvent, desirable coatings are produced at thicknesses which can be adjusted by the duration of the immersion, the temperature and heat capacity of the object and the viscosity of the composition. In the following examples, compositions are given in parts by weight.

EXAMPLE 1

An aluminum plate (0.6×8×12.5 cm) was preheated at 175° C., dipped in the following coating composition for 15–20 sec, and then placed in an oven and baked at 185° C. for 8 minutes. When it was removed from the oven, it had excellent appearance, it was very glossy, and did not show any sagging of the coating. The thickness of the coating was 140 μm.

Composition

PVF powder: 290
$TiO_2$: 126
Epoxy (DER 664U from Dow Chemical): 4.3
γ-butyrolactone: 1375
Triphenyl phosphite: 0.9
Triethylamine: 5.7

The composition was sandground to give a viscosity of 3200 centipoises (cps), when measured with #3 spindle to 10 rpm.

EXAMPLE 2

A cylindrical object made of aluminum, and having a diameter of 9 cm, length of 25 cm and wall thickness of 0.5 cm was preheated at 205° C., and dipped in the following composition for 20 sec. It was then baked in an oven at 205° C. for 10 minutes in a solvent-rich atmosphere, and 5 minutes in air. The same object, after it cooled down, was reheated in a 205° C. oven for 15 minutes. It was then turned upside down and the dipping and baking processes were repeated as described above. The coating thickness was 275 to 300 μm. Due to the characteristics of the technique, the coating at the upper portion is somewhat thicker than the coating at the lower portion.

Composition

PVC powder: 104
$TiO_2$ pigment: 45
Epoxy (DER 664 U): 1.5
γ-butyrolacetone: 522
Triphenyl phosphite: 0.3
Triethylamine: 3.0

The composition was sandground as in Example 1.

EXAMPLE 3

A cylindrical aluminum object having a diameter of approx 25 cm, length of approx. 35 cm and wall thickness of approximately 0.5 cm was preheated in a 150° C. oven for 20 minutes. It was then dipped in the composition for 20 seconds, and baked in a 205° C. oven for 10 minutes in a solvent-rich atmosphere and 10 minutes in air. A uniform coating of approximately 200 μm was deposited on the surface of the object.

Composition

Propylene carbonate: 400.0
PVF powder: 200.0

The composition was sandground to give a viscosity of 2,300 cps, when measured with #3 spindle at 10 rpm.

I claim:

1. A process for coating substrates by dipping a hotter substrate into a colder bath of polyvinyl fluoride dispersion in latent solvent,
wherein the substrate is at a temperature in the range of 120°–260° C. and the bath is at a temperature below 100° C.,
then removing the resulting coated substrate from the bath and curing the coating to a coalesced condition.

2. The process of claim 1 wherein the bath is at a viscosity of at least about 2000 centipoises, measured with #3 spindle at 10 rpm in a Brookfield Viscometer.

3. The process of claim 2 wherein the viscosity of the bath is less than about 20,000 centipoises, measured with #3 spindle at 10 rpm in a Brookfield viscometer.

* * * * *